United States Patent [19]

Coppens et al.

[11] Patent Number: 5,536,304
[45] Date of Patent: Jul. 16, 1996

[54] OIL AND WATER REPELLENT COMPOSITIONS

[75] Inventors: Dirk M. Coppens, Antwerpen; Kathy Allewaert, Heverlee, both of Belgium

[73] Assignee: Minnesota Mining and Manufacturing Company, St. Paul, Minn.

[21] Appl. No.: 323,381

[22] Filed: Oct. 14, 1994

[30] Foreign Application Priority Data

Oct. 19, 1993 [EP] European Pat. Off. ............... 9316871

[51] Int. Cl.$^6$ ..................................................... B32B 9/04
[52] U.S. Cl. ............................ 252/8.57; 106/287.14; 106/287.13; 106/287.16; 106/287.27; 106/287.28; 252/806; 252/8.62; 428/421; 428/447; 524/265; 524/462; 525/104; 525/464; 525/474; 249/214
[58] Field of Search ....................... 106/2, 287.14, 106/287.13, 287.27, 287.28, 287.16; 252/8.6, 8.57; 524/265, 462; 428/421, 447; 525/104, 464, 474; 549/214

[56] References Cited

U.S. PATENT DOCUMENTS

| 3,341,497 | 9/1967 | Sherman et al. | 260/72 |
| 3,420,697 | 1/1969 | Sweeney et al. | 117/121 |
| 3,445,491 | 5/1969 | Pacini | 260/399 |
| 3,470,124 | 9/1969 | Van Eygen et al. | 260/29.6 |
| 3,544,537 | 12/1970 | Brace | 260/89.5 |
| 3,546,187 | 12/1970 | Tandy, Jr. | 260/80.76 |
| 3,955,027 | 5/1976 | Vaughn | 428/262 |
| 4,054,592 | 10/1977 | Dear et al. | 560/25 |
| 4,070,152 | 1/1978 | Pentz | 8/115.6 |
| 4,215,205 | 7/1980 | Landucci | 525/331 |
| 4,426,466 | 1/1984 | Schwartz | 523/455 |
| 4,468,527 | 8/1984 | Patel | 564/96 |
| 4,477,498 | 10/1984 | Deiner et al. | 427/399.9 |
| 4,499,149 | 2/1985 | Berger | 428/447 |
| 4,540,497 | 9/1985 | Chang et al. | 252/8.8 |
| 4,566,981 | 1/1986 | Howells | 252/8.8 |
| 4,857,212 | 8/1990 | Ona et al. | 252/8.6 |
| 4,931,062 | 6/1990 | Bay et al. | 8/94.23 |
| 5,015,700 | 5/1991 | Herzig | 525/487 |
| 5,019,428 | 5/1991 | Ludemann et al. | 427/397 |
| 5,084,191 | 1/1992 | Nagase et al. | 252/8.6 |
| 5,132,028 | 7/1992 | Nagase et al. | 252/8.6 |

FOREIGN PATENT DOCUMENTS 312949 4/1989 European Pat. Off. .
62-104975 5/1987 Japan .

OTHER PUBLICATIONS

Banks, Ed., *Organofluorine Chemicals and Their Industrial Applications*, Ellis Horwood Ltd., Chichester, England, 1979, pp. 226–234.
Walter Noll, *Chemistry and Technology of Silicones*, Academic Press, New York, pp. 585–603 (1968).

*Primary Examiner*—Melissa Bonner
*Attorney, Agent, or Firm*—Gary L. Griswold; Walter N. Kirn; John A. Fortkort

[57] ABSTRACT

The invention relates to a water and oil repellency imparting composition which comprises:
(a) a fluoroaliphatic radical-containing agent; and
(b) a cyclic carboxylic anhydride-containing polysiloxane.
Additionally, the composition may comprise:
(c) an extender and/or a plasticizer. The composition provides water and oil repellent properties and a soft hand to fibrous and other substrates treated therewith.

22 Claims, No Drawings

1

OIL AND WATER REPELLENT COMPOSITIONS

TECHNICAL FIELD

This invention relates to a composition comprising a fluoroaliphatic radical-containing agent and a cyclic carboxylic anhydride-containing polysiloxane for imparting water and oil repellency as well as a soft hand to fibrous substrates and other materials treated therewith.

In another aspect, this invention relates to a method of using such composition to treat such substrates and materials, and in another aspect it relates to the so-treated substrates and materials.

BACKGROUND

The treatment of fibrous substrates with fluorochemical compositions to impart water and oil repellency is known; see, for example, Banks, Ed., *Organofluorine Chemicals and Their Industrial Applications,* Ellis Horwood Ltd., Chichester, England, 1979, pp. 226–234. Such fluorochemical compositions include, for example, fluorochemical guanidines (U.S. Pat. No. 4,540,497), compositions of cationic and non-ionic fluorochemicals (U.S. Pat. No. 4,566,981), compositions containing fluorochemical carboxylic acid and epoxidic cationic resin (U.S. Pat. No. 4,426,466), and fluoroaliphatic alcohols (U.S. Pat. No. 4,468,527).

Additives have been employed to assist in the oil and water repellency of fluorochemical treating agents.

U.S. Pat. No. 4,215,205 discloses combinations of fluorochemical vinyl polymer and carbodiimide in compositions said to impart durable water and oil repellency to textiles. Some of the carbodiimides disclosed contain fluoroaliphatic groups.

U.S. Pat. No. 5,132,028 discloses compositions for imparting water and oil repellency to fabrics such as silk, said compositions containing a fluorochemical-type, water and oil repellent agent, a carbodiimide, and at least one component selected from the group consisting of plasticizer, metal alcoholate or ester, zirconium salt, alkylketene dimer, aziridine, and alkenyl succinic anhydride.

U.S. Pat. No. 3,955,027 discloses an improved process and composition for water and oil proofing textiles which comprises treating a textile with a polymeric fluorocarbon finishing agent and at least one reactive polymer extender having acid or anhydride functionality and curing the treated textile at from 80° C. to 170° C. for 0.1 to 60 min.

Silicones and polymeric siloxanes, such as the industrially available polyorganosiloxanes, like polymethylsiloxanes, are also known to impart water repellency to leather, textiles, and paper; see, for example, *Chemistry and Technology of Silicones* by Walter Noll, Academic Press, New York, pp. 585–603 (1968).

EP-A-299 596 describes a fiber treatment composition based on a microemulsion of a carboxy-modified organopolysiloxane having at least two carboxyl groups in each molecule and the use of the composition in the treatment of natural fibers such as wool, silk or cotton.

EP-A-324 345 describes a process for making leather, leather substitutes and pelts hydrophobic with a carboxyl group containing polysiloxane whose carboxylic groups are present in neutralized form. Preferred are those polysiloxanes which contain terminal carboxylic anhydride groups. The anhydride groups of the polysiloxanes can be reacted with amines or alcohols to form esters or partial esters.

U.S. Pat. No. 4,070,152 discloses compositions comprising a textile treating resin which is a fluorine-containing polymer and a novel copolymer of a maleic-anhydride copolymer and a fatty acid amine and an amino organo polysiloxane. Said compositions are useful for increasing the water and oil repellency of substrates such as textiles, paper, or leather.

Although water and oil repellent treating agents are readily available, it is well known that they are expensive. Also, the efficiency in water and/or oil repellency is not always satisfactory. Furthermore, when they are employed for the treatment of textiles, they suffer from the disadvantage that they tend to give the treated textile a hard feeling. Although silicone softeners can be applied to overcome this problem, silicones are usually not compatible with the fluorochemical treating agent, and therefore, the treated substrates typically will show a decrease in water and oil repellency.

DISCLOSURE OF INVENTION

It is an object of the present invention to provide a water and oil repellency imparting composition which is less expensive and which can give higher water and oil repellency as well as a soft hand with a simple one step treatment technique.

The object can De achieved by a water and oil repellency imparting composition comprising
  (a) a fluoroalphatic radical-containing agent; and
  (b) a cyclic carboxylic anhydride-containing polysiloxane.

Applicants have found that a cyclic carboxylic anhydride-containing polysiloxane when used together with a fluoroaliphatic radical-containing agent significantly increases the water and oil repellency imparting effect of the latter. It was also found that a significantly smaller amount of fluoroaliphatic radical-containing agent is required for imparting oil and water repellency to the treated substrate if a cyclic carboxylic anhydride-containing polysiloxane is additionally used, whereas larger amounts are required when the fluoroaliphatic radical-containing agent is used alone.

It was further found that the cyclic carboxylic anhydride-containing polysiloxanes show high compatibility with commonly used fluoroaliphatic radical-containing agents and with optionally used extenders, hence treated substrates have a soft feeling while at the same time the high oil and water repellency is retained.

DETAILED DESCRIPTION

Briefly, in one aspect the present invention provides a water and oil repellency imparting composition for fibrous and other substrates, said composition comprising a fluorochemical-type, water and oil repellent agent (such as fluoroaliphatic radical-containing polyacrylate or polyurethane) and a cyclic carboxylic anhydride-containing polysiloxane. The composition can further optionally comprise other additives such as, e.g., conventional hydrocarbon extenders and plasticizers. The composition can be applied, e.g., to a fibrous substrate by contacting the substrate with the composition, for example, by immersing it in a bath of the composition or by spraying the composition onto the substrate. The treated substrate is then dried to remove the solvent therefrom, for example by volatilization.

The composition of this invention imparts desirable water and oil repellency and a soft hand to the substrates treated therewith without adversely affecting other properties of the substrate. The composition of the present invention can be used for providing water and oil repellency and soft hand to fibrous substrates such as textiles, papers, non-woven articles, leather or for providing water and oil repellency to other substrates such as plastic, wood, metal, glass, stone and concrete.

While any fluoroaliphatic radical-containing agent may be used in the present invention, an important feature of compositions of the present invention is that any of the known fluoroaliphatic radical-containing agents useful for the treatment of fabrics to obtain repellency of water and oily and aqueous stains can be used. Fluoroaliphatic radical-containing agents include condensation polymers such as polyesters, polyamides or polyepoxides and vinyl polymers such as acrylates, methacrylates or polyvinyl ethers. Such known agents include, for example, those described in U.S. Pat. Nos. 3,546,187; 3,544,537; 3,470,124; 3,445,491; 3,341,497 and 3,420,697.

Further examples of such fluoroaliphatic radical-containing water and oil repellency imparting agents include those formed by the reaction of perfluoroaliphatic thioglycols with diisocyanates to provide perfluoroaliphatic group-bearing polyurethanes. These products are normally applied as aqueous dispersions for fibre treatment. Such reaction products are described, for example, in U.S. Pat. No. 4,054,592. Another group of compounds which can be used are fluoroaliphatic radical-containing N-methylolcondensation products. These compounds are described in U.S. Pat. No. 4,477,498. Further examples include fluoroaliphatic radical-containing polycarbodiimides which can be obtained by, for example, reaction of perfluoroaliphatic sulfonamido alkanols with polyisocyanates in the presence of suitable catalysts.

The fluorochemical component is preferably a copolymer of one or more fluoroaliphatic radical-containing acrylate or methacrylate monomers and one or more fluorine-free (or hydrocarbon) terminally ethylenically-unsaturated co-monomers. Classes of the fluorochemical monomer can be represented by the formulas:

$$R_fR^1OCOC(R^2)=CH_2$$

and

$$R_fSO_2N(R^3)R^4OCOC(R^2)=CH_2$$

where $R_f$ is a fluoroaliphatic radical;

$R^1$ is an alkylene with, for example, 1 to 10 carbon atoms, e.g., methylene or ethylene, or is —$CH_2CH(OR)CH_2$—, where R is hydrogen or $COCH_3$;

$R^2$ is hydrogen or methyl;

$R^3$ is hydrogen or an alkyl with, for example, 1 to 10 carbon atoms, e.g., methyl or ethyl; and $R^4$ is an alkylene with, for example, 1 to 10 carbon atoms, e.g., methylene or ethylene.

The fluoroaliphatic radical, called $R_f$ for brevity, is a fluorinated, stable, inert, preferably saturated, non-polar, monovalent aliphatic radical. It can be a straight chain, branched chain, or cyclic or combinations thereof. It can contain heteroatoms, bonded only to carbon atoms, such as oxygen, divalent or hexavalent sulfur, or nitrogen. $R_f$ is preferably a fully-fluorinated radical, but hydrogen or chlorine atoms can be present as substituents if not more than one atom of either is present for every two carbon atoms. The $R_f$ radical has at least 3 carbon atoms, preferably 3 to 14 carbon atoms, and preferably contains about 40% to about 78% fluorine by weight, more preferably about 50% to about 78% fluorine by weight. The terminal portion of the $R_f$ radical is a perfluorinated moiety, which will preferably contain at least 7 fluorine atoms, e.g., $CF_3CF_2CF_2$—, $(CF_3)_2$—CF, $F_5SCF_2$—. The preferred $R_f$ radicals are fully or substantially fluorinated and are preferably those perfluorinated aliphatic radicals of the formula $C_nF_{2n+1}$— where n is 3 to 14.

Representative examples of fluorochemical monomers are:

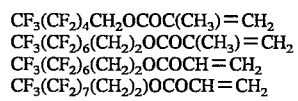
$CF_3(CF_2)_4CH_2OCOC(CH_3)=CH_2$
$CF_3(CF_2)_6(CH_2)_2OCOC(CH_3)=CH_2$
$CF_3(CF_2)_6(CH_2)_2OCOCH=CH_2$
$CF_3(CF_2)_7(CH_2)_2OCOCH=CH_2$

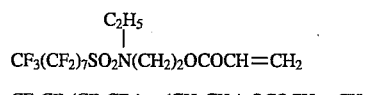
$$\underset{\underset{C_2H_5}{|}}{CF_3(CF_2)_7SO_2N(CH_2)_2OCOCH=CH_2}$$

$CF_3CF_2(CF_2CF_2)_{2-8}(CH_2CH_2)_2OCOCH=CH_2$

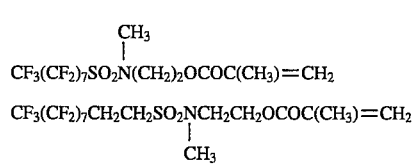
$$\underset{\underset{CH_3}{|}}{CF_3(CF_2)_7SO_2N(CH_2)_2OCOC(CH_3)=CH_2}$$

$$CF_3(CF_2)_7CH_2CH_2SO_2NCH_2CH_2OCOC(CH_3)=CH_2$$
$$|$$
$$CH_3$$

Preferred co-monomers which can be copolymerized with the above-described fluoroaliphatic radical-containing monomers are not hydrophilic and include those selected from the group consisting of octadecylmethacrylate, 1,4-butanediol diacrylate, laurylmethacrylate, butylacrylate, N-methylolacrylamide, isobutylmeth-acrylate, vinylchloride and vinylidene chloride.

The relative weight ratio of the fluoroaliphatic monomer(s) to the hydrocarbon co-monomer(s) can vary as is known in the art, and generally the weight ratio of them will be 50–95:50–5.

Suitable cyclic carboxylic anhydride-containing polysiloxanes can be represented by the following formula I:

$$AR[Si(R^5)_2O]_ySi(R^5)_2RA \qquad (I)$$

wherein

A is a cyclic carboxylic anhydride,

R is an aliphatic or aromatic linking group, $R^5$ is a hydrocarbon residue containing 1 to 18 carbon atoms, and y is an integer from 5 to 200.

In addition to or instead of the terminal cyclic carboxylic anhydride groups A, some of the residues $R^5$ may bear such cyclic carboxylic anhydride groups, as represented by the following formula I':

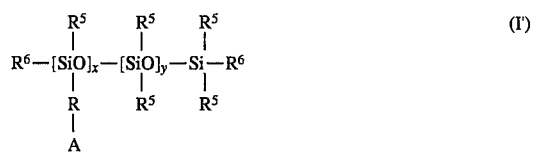
$$R^6-\underset{\underset{A}{\underset{|}{R}}}{\overset{\overset{R^5}{|}}{[SiO]_x}}-\underset{\underset{R^5}{|}}{\overset{\overset{R^5}{|}}{[SiO]_y}}-\underset{\underset{R^5}{|}}{\overset{\overset{R^5}{|}}{Si}}-R^6 \qquad (I')$$

wherein A, R, $R^5$ and y are as defined for formula I, x is an integer of at least 1 and $R^6$ is a terminal group, optionally comprising cyclic carboxylic anhydride groups.

Preferably the cyclic carboxylic anhydride-containing polysiloxane is a polydimethylsiloxane containing terminal succinic anhydride groups, as can be represented by the following formula II.

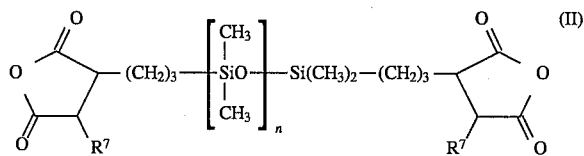

n is an integer between 5 and 200, and $R^7$ is an alkyl residue having 1 to 4 carbon atoms, or, preferably, is H.

Other representative examples of cyclic carboxylic anhydride-containing polydialkylsiloxanes are described in European Patent Office Publication A-415204.

The cyclic carboxylic anhydride-containing polysiloxane is used in an amount between 5% and 300% by weight, preferably between 10% and 200%; by weight, based on the fluoroaliphatic radical-containing agent.

To the composition of the present invention, it is possible to add aliphatic extenders such as compositions containing alkylketenes or derivatives thereof; chlorohydrates of stearamidomethylpyridinium; condensates of fatty acids with melamine or urea derivatives (such as the product obtained on reacting stearic acid with hexamethoxymethylmelamine); condensates of fatty acids with polyamines (such as the reaction product of stearic acid with diethylenetriamine) and their epichlorohydrin adducts; polymers and copolymers of acrylates, methacrylates, maleic anhydride, olefins, or halogenated olefins; or isocyanate derivates such as oxime-blocked urethanes and isocyanurates. It is also possible to use salts of inorganic or organic acids such as aluminum stearate, zirconium acetate, zirconium oxychloride or Werner complexes such as chromium stearatochloride. If used, the extender will be added at a minimum amount of 5% by weight, preferably in a minimum amount of 10% by weight of the fluoroaliphatic radical-containing agent. The ratio of fluoroaliphatic radical-containing agent to extender preferably is between 1:0.05 and 1:3, more preferably is between 1:0.1 and 1:1.5 by weight.

The oil and water repellency imparting compositions of the present invention may further comprise other additives, such as plasticizers. Suitable plasticizers include aliphatic or aromatic esters, such as dioctyladipate, dioctylazelate, ditridecyladipate, di(2-ethylhexyl)azelate, di(2-ethylhexyl) maleate, diethylhexylsebacate, butylbenzylphthalate, dioctylphthalate, dibutylphthalate, diisodecylphthalate, ditridecylphtalate, and diisononylphthalate; polyester type plasticizers such as Priplast plasticizers (available from Unichema Chemie GmbH, Emmerich, GERMANY); paraffins and substituted paraffins, such as chloroparaffins (available from Hüls AG, Marl, GERMANY); epoxy-type plasticizers, such as Rheoplast plasticizers (available from Ciba-Geigy AG, Basel, SWITZERLAND). If used, the plasticizer is present in an amount of between 10 and 200%, preferably between 20 and 100% by weight of the fluoroaliphatic radical-containing agent.

For application, the water and oil repellency imparting composition can be used in solvent solution, emulsion and aerosol forms. Preferably, the composition is used in solvent solution form.

Suitable solvents are those that are capable of solubilizing the fluoroaliphatic radical-containing agent, the cyclic carboxylic anhydride-containing polysiloxane and the optional hydrocarbon extender and plasticizer. Suitable solvents include chlorinated hydrocarbons, isoparaffinic hydrocarbons, alcohols, esters, ketones and mixtures thereof. Usually, the solvent solutions will contain 0.1 to 10% or even up to 50% by weight solids.

The presence of water in solutions of the compositions of the invention may cause ring opening of the cyclic anhydride which will impair the performance properties of the cyclic carboxylic anhydride-containing polysiloxane copolymer. Therefore, it is generally preferred that solutions of the compositions of the invention are substantially water-free. This means that solutions of the composition of the present invention preferably do not contain more than 5% by weight, more preferably not more than 1% by weight, and still more preferably not more than 0.5% by weight of water, based on the total weight of the composition. Most preferably the compositions of the invention and their solutions do not contain any water.

The amount of the composition applied to a substrate in accordance with this invention is chosen so that sufficiently high or desirable water and oil repellencies are imparted to the substrate surface, said amount usually being such that 0.01% to 5% by weight, preferably 0.05 to 2% by weight based on the weight of the substrate, of fluoroaliphatic radical-containing agent and cyclic carboxylic anhydride-containing polysiloxane is present on the treated substrate. The amount which is sufficient to impart desired repellency can be determined empirically and can be increased as necessary or desired.

The treatment of fibrous substrates using the water and oil repellency imparting composition of the present invention is carried out by using well-known methods including dipping, spraying, padding, knife coating, and roll coating. Drying of the substrate is done at 120° C. or below, including room temperature, e.g., about 20° C., with optionally heat-treating the textile products in the same manner as in conventional textile processing methods.

The substrates treated by the water and oil repellency imparting composition of this invention are not especially limited and includes textile fabrics, fibres, non-wovens, leather, paper, plastic, wood, metal, glass, concrete and stone.

Respective data of water and oil repellency shown in the Examples and Comparative Examples are based on the following methods of measurement and evaluation criteria:

SPRAY RATING

The spray rating (SR) of a treated substrate is a value indicative of the dynamic repellency of the treated substrate to water that impinges on the treated substrate, such as encountered by apparel in a rainstorm. The rating is measured by Standard Test Number 22, published in the 1977 Technical Manual and Yearbook of the American Association of Textile Chemists and Colorists (AATCC), and is expressed in terms of the "spray rating" of the tested substrate. The spray rating is obtained by spraying water on the substrate and is measured using a 0 to 100 scale where 100 is the highest possible rating.

OIL REPELLENCY

The oil repellency (OR) of a treated substrate is measured by the American Association of Textile Chemists and Colorists (AATCC) Standard Test Method No. 118-1983, which test is based on the resistance of treated substrate to penetration by oils of varying surface tensions. Treated substrates resistant only to Nujol®, mineral oil (the least penetrating of the test oils) are given a rating of 1, whereas treated substrates resistant to heptane (the most penetrating of the test oils) are given a rating of 8. Other intermediate values are determined by use of other pure oils or mixtures of oils, as shown in the following table.

| Standard Test Liquids | |
|---|---|
| AATCC Oil Repellency Rating Number | Composition |
| 1 | Nujol ® |
| 2 | Nujol ®/n-hexadecane 65/35 |
| 3 | n-Hexadecane |
| 4 | n-Tetradecane |
| 5 | N-Dodecane |
| 6 | n-Decane |
| 7 | n-Octane |
| 8 | n-Heptane |

ABBREVIATIONS

The following abbreviations and trade names are used in the examples:
SLM 50240/1: Succinic anhydride terminated
SLM 50240/2: dimethylsiloxanes according to
SLM 50240/3: formula II (1: n=10; 2: n=40;
SLM 50240/4: 3: n=100; 4: n=25), available from Wacker Chemie GmbH, Munich GERMANY
Silicon öl TR 50 and AP 200: Dimethyl polysiloxane and phenylmethylpolysiloxane, available from Wacker Chemie GmbH, Munich, GERMANY
Dow Corning 244: Polydimethylcyclosiloxane, available from Dow Corning Corp., Midland, Mich., U.S.A.
VP-1680: Si-H containing dimethylpolysiloxane, available from Wacker Chemie GmbH, Munich, GERMANY
VP-1195: A fluorosilicone, available from Wacker Chemie GmbH, Munich, GERMANY
SLM 50250/2: Epoxy terminated and hydroxy terminated
SLM 50400/6: poly-dimethylsiloxanes, available from Wacker Chemie GmbH, Munich, GERMANY
SH8011: A 50% solution in mineral spirits of polydimethylsiloxane, polyhydroxymethylsiloxane and $Zn(BF_4)_2$ available from Toray Industries Inc., Tokyo, JAPAN
Accosize 18: n-Octadecyl succinic anhydride, available from Cyanamid Company, Wayne, N.J., U.S.A.
CX 100: Oligomeric aziridine, available from Imperial Chemical Industries, London, UNITED KINGDOM
UCARLNK XL27HS: Polycarbodiimide, available from Union Carbide Corporation, Danbury, Conn., U.S.A.
Butylzirkonate: Available from Hüls AG, Marl, GERMANY
WPU: Wet pick up
SOF: Solids on fiber
MIBK: Methyl isobutyl ketone
DOZ: Dioctylazelate, available from Unichema Chemie GmbH, Emmerich, GERMANY

EXAMPLES

The following examples are intended to be illustrative and should not be construed as limiting the invention in any way. All parts, percentages, etc. in the examples and the rest of the specification, are by weight unless otherwise noted.

FLUOROALIPHATIC RADICAL-CONTAINING AGENTS

The fluoroaliphatic radical-containing agents used in the examples of the present invention are commercially available from Minnesota Mining and Manufacturing Company, St. Paul, Minn.

FX-3530 is a fluoroaliphatic radical-containing polymethacrylate (the fluoroaliphatic radical is in the alcohol part of the polymethacrylate), sold as 25 weight % solution of fluoropolymer in ethylacetate/heptane.

FX-3532 is a fluoroaliphatic radical-containing polyurethane, sold as a 40% solution of fluoropolymer in ethylacetate.

FX-3534 is a fluoroaliphatic radical-containing polymethacrylate (the fluoroaliphatic radical is in the alcohol part of the polymethacrylate), sold as a 30% solution of fluoropolymer in methylethylketone.

FX-3539 is a fluoroaliphatic radical-containing polyurethane acrylate, sold as a 30% solution of fluoropolymer in MIBK and dioctyladipate.

COMMERCIALLY AVAILABLE SUBSTRATES

Pes/Co Utex: Grey polyester/cotton 65/35, style No. 2681, obtained through Utexbel N.V., Ghent, BELGIUM
100% Cotton: Bleached, mercerized cotton poplin, Style No. 407, purchased from Testfabrics, Inc., U.S.A.
Silk: JIS colour fastness test substrate
Wool:
Polyamide: Blue nylon taffeta, obtained from Testfabrics Inc., U.S.A.

EXAMPLE I AND COMPARATIVE EXAMPLES C-1 TO C-9

In example 1 a blend was made of the fluoroaliphatic radical-containing agent FX-3530 with the succinic anhydride terminated polydimethylsiloxane SLM 50240/2 in heptane. Comparative example C-1 was made without the addition of SLM 50240/2; comparative examples C-2 to C-9 were made using a combination of FX-3530 with various commercially available polysiloxanes, without cyclic anhydride groups. The blends were applied to 100% cotton fabric by solvent padding, at 100% WPU (wet pick up). The fabrics were dried at room temperature. Alternatively, the fabrics were additionally ironed at 150° C. for 15 sec. In all cases, the tests were done in a way to give a concentration of the treating solution of 0.3% solids on fiber. The results are given in Table 1.

TABLE 1

Performance properties of 100% cotton treated with a mixture of FX-3530 and silicone softeners

| | | Dried | | Dried + Ironed | | |
|---|---|---|---|---|---|---|
| Ex. No. | Silicone Softener | OR | SR | OR | SR | Hand* |
| 1 | SLM 50240/2 | 2 | 90 | 2 | 90 | 4 |
| C-1 | / | 2 | 60 | 2 | 75 | 1 |
| C-2 | Siliconöl TR 50 | 0 | 50 | 0 | 70 | 2 |
| C-3 | Dow Corning 244 | 1 | 50 | 1 | 70 | 1 |
| C-4 | Siliconöl AP 200 | 2 | 50 | 2 | 60 | 2 |
| C-5 | VP-1680 | 1 | 60 | 1 | 70 | 3 |
| C-6 | VP-1195 | 0 | 50 | 0 | 70 | 2 |
| C-7 | SLM 50250/2 | 1 | 50 | 0 | 70 | 4 |
| C-8 | SLM 50400/6 | 1 | 0 | 0 | 60 | 3 |
| C-9 | SH 8011 | 1 | 80 | 1 | 85 | 3 |

Note: * the higher the value, the softer the feeling of the substrate

The results of the tests show that the use of a cyclic carboxylic anhydride-containing polysiloxane (SLM 50240/2) in combination with a fluoroaliphatic radical-containing agent increases the overall performance of a treated substrate. The water repellency of the FX-3530 is boosted without affecting the oil repellency. In addition, the treated substrate has a much softer feeling or hand. In all other cases (C-1 to C-9) lower performance properties of the treated substrate are observed.

EXAMPLES 2 TO 5 AND COMPARATIVE EXAMPLES C-10 TO C-13

Examples 2 to 5 were made in order to evaluate the effectiveness of the composition of the present invention for treatment of various fibrous substrates. Comparative examples C-10 to C-13 were made by applying the same fluoroaliphatic radical-containing agent without siloxane softener to the substrate.

The treatment solutions (in MIBK) were applied to the different substrates by solvent padding, at 100% WPU. The treated fabrics were dried at room temperature, eventually followed by a heat treatment for 15 sec at 150° C. (ironed). This method provided the fabrics with 0.3% SOF FX-3530 and 0.15% silicone SLM 50240/2. The results of the performance tests are given in Table 2.

TABLE 2

Performance properties of substrates treated with FX-3530 and SLM 50240/2 mixtures

| Ex. No. | Substrate | SLM 50240/2 | Air Dry OR | Air Dry SR | Ironed OR | Ironed SR |
|---|---|---|---|---|---|---|
| 2 | Pes/Co Utex | yes | 2 | 90 | 3 | 85 |
| C-11 | Pes/Co Utex | no | 2 | 70 | 3 | 75 |
| 3 | Silk | yes | 5 | 90 | / | / |
| C-12 | Silk | no | 5 | 80 | / | / |
| 4 | Wool | yes | 2 | 95 | 6 | 100 |
| C-13 | Wool | no | 3 | 80 | 6 | 95 |
| 5 | Polyamid | yes | 2 | 80 | 2 | 90 |
| C-14 | Polyamid | no | 2 | 75 | 2 | 85 |

In all cases, the water repellency is increased without affecting the oil repellency. All substrates treated with SLM 50240/2 have a softer feeling or hand.

EXAMPLES 6 TO 9

Examples 6 to 9 were made in the same way as example 1 but hydrocarbon extenders were added to the mixture of the fluoroaliphatic radical-containing agent FX-3530 and the softener SLM 50240/2.

The blends (in MIBK) were applied to 100%; cotton fabric by solvent padding, at 1004 WPU. The fabrics were dried at room temperature. Alternatively, the fabrics were additionally ironed at 150° C. for 15 sec. In all cases, the tests were done in a way to give a concentration of 0.3 % SOF FX-3530, 0.15 % SOF SLM 50240/2 and 0.05 % SOF of hydrocarbon extender. The results are given in Table 3.

TABLE 3

Performance properties of 100% cotton substrates treated with a mixture of FX-3530, SLM 50240/2 and different extenders

| Ex. No. | Extender | Dried OR | Dried SR | Dried + Ironed OR | Dried + Ironed SR | Hand |
|---|---|---|---|---|---|---|
| 6 | Accosize 18 | 2 | 95 | 1 | 95 | 4 |
| 7 | CX100 | 4 | 100 | 2 | 100 | 4 |

TABLE 3-continued

Performance properties of 100% cotton substrates treated with a mixture of FX-3530, SLM 50240/2 and different extenders

| Ex. No. | Extender | Dried OR | Dried SR | Dried + Ironed OR | Dried + Ironed SR | Hand |
|---|---|---|---|---|---|---|
| 8 | UCARLNK SL27HS | 2 | 100 | 1 | 100 | 4 |
| 9 | Butylzirkonate | 2 | 80 | 2 | 80 | 4 |

The performance of the treated substrates, especially the water repellency can be increased by incorporating an extender in the composition of the present invention.

EXAMPLES 10 TO 13 AND COMPARATIVE EXAMPLE C-15

In examples 10 to 13, blends were made of the fluoroaliphatic radical-containing agent FX-3530 with succinic anhydride terminated polydimethylsiloxanes (SLM 50240) having various chain lengths. Comparative example C-15 was made only with FX-3530. The blends, made in MIBK, were applied to Pes/Co Utex fabric by solvent padding at 100% WPU. The fabrics were dried at room temperature, eventually additionally ironed at 150° C. for 15 sec. In all cases, the tests were done in a way to give a concentration of FX-3530 of 0.3% solids on fiber. Examples 10 to 13 additionally had 0.15% SOF of SLM 50240. The results of oil repellency and spray rating are given in Table 4.

TABLE 4

Performance properties of Pes/Co Utex fabric treated with a mixture of FX-3530 and SLM 50240

| Ex. No. | Silicone Softener | n (formula II) | Dried OR | Dried SR | Dried + Ironed OR | Dried + Ironed SR |
|---|---|---|---|---|---|---|
| 10 | SLM 50240/1 | 10 | 3 | 100 | 3 | 100 |
| 11 | SLM 50240/4 | 25 | 2 | 100 | 3 | 100 |
| 12 | SLM 50240/2 | 40 | 2 | 90 | 2 | 90 |
| 13 | SLM 50240/3 | 100 | 2 | 80 | 1 | 80 |
| C-15 | / | / | 2 | 70 | 3 | 70 |

In all cases an improvement in water repellency is observed.

In order to keep acceptable oil repellency, it is preferred that n does not exceed 100.

EXAMPLES 14 TO 17 AND COMPARATIVE EXAMPLE C-16

In examples 14 to 17, different amounts of a plasticizer, dioctylazelate have been evaluated in combination with fluoroaliphatic radical-containing agent FX-3530 and succinic anhydride terminated polydimethylsiloxane SLM 50240/2. Comparative example C-16 was made by using only FX-3530. The blends were made in MIBK and applied to Pes/Co Utex fabric by solvent padding at 100% WPU. The fabrics were dried at room temperature, eventually additionally ironed at 150° C. for 15 sec. The concentration of the agents on the fabric as well as the test results for oil and water repellency are given in Table 5.

TABLE 5

Performance properties of Pes/Co Utex fabric treated with a mixture of FX-3530 and SLM 50240/2

| Ex. No. | % SOF FX03530 | % SOF SLM 50240/2 | % SOF DOX | Dried OR | SR | Dried + Ironed OR | SR |
|---|---|---|---|---|---|---|---|
| 14 | 0.3 | 0.06 | / | 4 | 100 | 3 | 100 |
| 15 | 0.3 | 0.06 | 0.075 | 5 | 100 | 5 | 100 |
| 16 | 0.3 | 0.06 | 0.15 | 5 | 100 | 5 | 100 |
| 17 | 0.3 | 0.06 | 0.3 | 5 | 100 | 5 | 100 |
| C-16 | 0.3 | / | / | 5 | 70 | 4 | 70 |

The results in this table indicate that the performance, especially the oil repellency of the treated fabric, can be further improved by adding a plasticizer to the treating composition of the present invention.

EXAMPLES 18 TO 21 AND COMPARATIVE EXAMPLES C-17 TO C-20

In examples 18 to 21, blends were made of different types of fluoroaliphatic radical-containing agents (as indicated in Table 6) with succinic anhydride terminated polydimethylsiloxane SLM 50240/2. The blends, in MIBK, were applied to Pes/Co Utex fabric by solvent padding at 100% WPU. Comparative examples C-17 to C-20 were made without the addition of SLM 50240/2. After treatment, the fabrics were dried at room temperature. In all cases, the tests were done in a way to give a concentration of the treating solution of 0.3% solids on fiber. The results of oil and water repellency and hand are given in Table 6.

TABLE 6

Performance properties of Pes/Co Utex substrate treated with fluoroaliphatic radical-containing agent-SLM 50240/2 mixtures

| Ex. No. | Fluoroaliphatic Radical-containing agent (FC) | Ratio FC/SLM 50240/2 | OR | SR | Hand |
|---|---|---|---|---|---|
| 18 | FX-3530 | 80/20 | 5 | 100 | soft |
| C-17 |  | 100/0 | 5 | 70 | dry |
| 19 | FX-3532 | 80/20 | 2 | 70 | soft |
| C-18 |  | 100/0 | 3 | 70 | dry |
| 20 | FX-3534 | 80/20 | 4 | 100 | soft |
| C-19 |  | 100/0 | 5 | 80 | dry |
| 21 | FX-3539 | 80/20 | 2 | 70 | soft |
| C-20 |  | 100/0 | 2 | 50 | dry |

The results in this table indicate that in all cases an improvement of the hand is obtained without sacrifice of other properties as oil and water repellency. Except for FX-3532, in all cases also the water repellency is increased when the fluoroaliphatic radical-containing polymer is partially replaced by SLM 50240/2. The oil repellency is almost not affected.

EXAMPLES 22 TO 28 AND COMPARATIVE EXAMPLE C-21

In examples 22 to 23, the fluoroaliphatic radical-containing agent FX-3530 was gradually replaced by succinic anhydride terminated polydimethylsiloxane SLM 50240/2, so as to obtain a constant level of 0.3%; solids on fibre after drying. In examples 24 to 28, the level of FX-3530 was kept constant at 0.3% SOF and the amount of SLM 50240/2 was gradually increased. Comparative example C-21 was made without the addition of SLM 50240/2. All treatment solutions, made in MIBK, were applied to Pes/Co Utex fabric. After treatment, the fabrics were dried at room temperature. The results of oil and water repellency are given in Table 7.

TABLE 7

Performance properties of Pes/Co Utex fabric treated with FX-3530-SLM 50240/2 in different ratios

| Ex. No. | % SOF FX-3530 | % SOF SLM 50240/2 | Dried (RT) OR | SR | Hand |
|---|---|---|---|---|---|
| 22 | 0.24 | 0.06 | 4 | 100 | 3 |
| 23 | 0.18 | 0.12 | 4 | 100 | 3 |
| 24 | 0.3 | 0.03 | 5 | 90 | 2 |
| 25 | 0.3 | 0.06 | 4 | 100 | 3 |
| 26 | 0.3 | 0.15 | 5 | 100 | 4 |
| 27 | 0.3' | 0.3' | 4 | 100 | 4 |
| 28 | 0.3 | 0.6 | 6 | 100 | 4 |
| C-21 | 0.3 | 0 | 5 | 70 | 1 |

The results indicate that even a small amount of SLM 50240/2 gives a significant improvement in both spray rating and hand. The performance of the treated samples remain high, even when about half of the amount of FX-3530 is replaced by SLM 50240/2.

What is claimed is:

1. A water and oil repellency imparting composition comprising:
   (a) a fluoroaliphatic radical-containing agent; and
   (b) a cyclic carboxylic anhydride-containing polysiloxane.

2. The composition of claim 1, wherein component (b) is selected from compounds represented by the following formulas I and I':

$$AR[Si(R^5)_2O]_y Si(R^5)_2 RA \qquad (I)$$

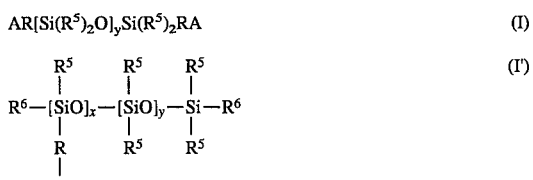

(I')

wherein

A is a cyclic carboxylic anhydride,

R is an aliphatic or aromatic linking group, $R^5$ is a hydrocarbon residue containing 1 to 18 carbon atoms, y is an integer from 5 to 200, x is an integer of at least 1, and $R^6$ is a terminal group, optionally comprising cyclic carboxylic anhydride groups.

3. The composition of claim 2, wherein some of the residues $R^5$ in the compound of the formula I bear cyclic carboxylic anhydride groups.

4. The composition according to claim 1, wherein component (b) is a compound represented by the following formula II:

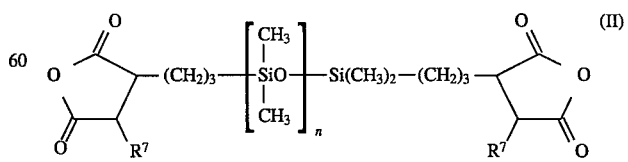

wherein n is an integer between 5 and 200, and f is an alkyl residue having 1 to 4 carbon atoms, or, H.

5. A method for providing water and oil repellent properties to fibrous and other substrates, comprising applying to such substrates a composition according to claim 1.

6. The method according to claim 5, wherein the substrate is selected from the group consisting of textile fabrics, textile fibers, non-wovens, leather or paper.

7. A substrate with water and oil repellent properties comprising a fibrous or non-fibrous substrate selected from the group consisting of textile fabrics, fibers, non-wovens, leather, paper, plastic, wood, metal, glass, concrete and stone, having on the surface thereof an amount of a composition according to claim 1 effective to impart water and oil repellent properties thereto.

8. A solution comprising a solvent and an amount of the composition according to claim 1 effective to provide water and oil repellent properties to a substrate treated therewith.

9. The solution of claim 8 which is substantially free of water.

10. An article, comprising:

a fibrous substrate; and a water or oil repellency imparting composition, comprising (a) a fluoroaliphatic radical-containing agent useful for imparting water or oil repellency, and (b) a cyclic carboxylic anhydride-containing polysiloxane.

11. The combination of claim 10, wherein component (b) is a compound represented by the formula:

AR[Si(R$^5$)$_2$O]$_y$Si(R$^5$)$_2$RA wherein

A is a cyclic carboxylic anhydride,

R is an aliphatic or aromatic linking group,

R$^5$ is a hydrocarbon residue containing 1 to 18 carbon atoms, y is an integer from 5 to 200, x is an integer of at least 1, and R$^6$ is a terminal group, optionally comprising cyclic carboxylic anhydride groups.

12. The combination of claim 10, wherein component (b) is a compound represented by the formula:

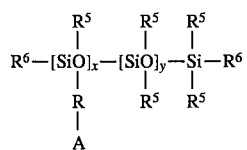

wherein

A is a cyclic carboxylic anhydride,

R is an aliphatic or aromatic linking group,

R$^5$ is a hydrocarbon residue containing 1 to 18 carbon atoms, y is an integer from 5 to 200, x is an integer of at least 1, and R$^6$ is a terminal group, optionally comprising cyclic carboxylic anhydride groups.

13. The combination of claim 10, wherein component (b) is a compound represented by the formula:

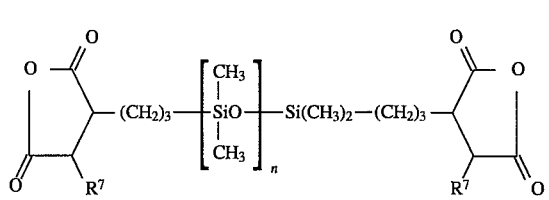

wherein n is an integer between 5 and 200, and

R$^7$ is H or an alkyl residue having 1 to 4 carbon atoms.

14. A water and oil repellency imparting composition, comprising:

(a) a fluoroaliphatic radical-containing agent useful for imparting water or oil repellency to a substrate; and (b) a cyclic carboxylic anhydride-containing polysiloxane;

wherein component (b) is present in an amount of at least about 5% by weight of component (a).

15. The composition of claim 14, wherein component (b) is used in an amount between about 5% and about 300% by weight of component (a).

16. The composition of claim 14, wherein component (b) is used in an amount between about 10% and about 200% by weight of component (a).

17. An article, comprising:

a substrate selected from the group consisting of textiles, fibers, non-wovens, leather, paper, wood, glass, plastic, concrete, and stone; and a composition, comprising (a) a fluoroaliphatic radical-containing agent useful for imparting water or oil repellency to said substrate, and (b) a cyclic carboxylic anhydride-containing polysiloxane.

18. The combination of claim 17, wherein component (b) is present in an amount of at least about 5% by weight of component (a).

19. The combination of claim 17, wherein said composition is applied to the substrate in an amount of at least about 0.01% by weight of the substrate.

20. A water or oil repellency imparting composition, comprising:

(a) a fluoroaliphatic radical-containing agent useful for imparting water or oil repellency; and (b) a cyclic carboxylic anhydride-containing polysiloxane;

wherein component (b) is a compound represented by the formula:

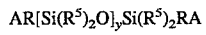
AR[Si(R$^5$)$_2$O]$_y$Si(R$^5$)$_2$RA wherein

A is a cyclic carboxylic anhydride,

R is an aliphatic or aromatic linking group,

R$^5$ is a hydrocarbon residue containing 1 to 18 carbon atoms, y is an integer from 5 to 200, x is an integer of at least 1, and R$^6$ is a terminal group, optionally comprising cyclic carboxylic anhydride groups.

21. A water or oil repellency imparting composition, comprising:

(a) a fluoroaliphatic radical-containing agent useful for imparting water or oil repellency; and (b) a cyclic carboxylic anhydride-containing polysiloxane;

wherein component (b) is a compound represented by the formula:

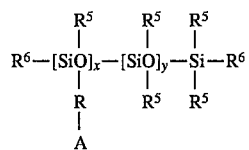

wherein

A is a cyclic carboxylic anhydride,

R is an aliphatic or aromatic linking group, $R^5$ is a hydrocarbon residue containing 1 to 18 carbon atoms, y is an integer from 5 to 200, x is an integer of at least 1, and $R^6$ is a terminal group, optionally comprising cyclic carboxylic anhydride groups.

22. A water or oil repellency imparting composition, comprising:

(a) a fluoroaliphatic radical-containing agent useful for imparting water or oil repellency; and (b) a cyclic carboxylic anhydride-containing polysiloxane;

wherein component (b) is a compound represented by the formula:

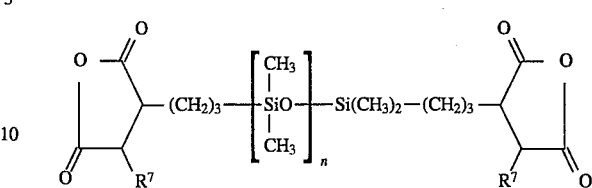

wherein

A is a cyclic carboxylic anhydride,

R is an aliphatic or aromatic linking group, $R^5$ is a hydrocarbon residue containing 1 to 18 carbon atoms, y is an integer from 5 to 200, x is an integer of at least 1, and $R^6$ is a terminal group, optionally comprising cyclic carboxylic anhydride groups.

* * * * *

UNITED STATES PATENT AND TRADEMARK OFFICE
CERTIFICATE OF CORRECTION

PATENT NO.: 5,536,304

DATED: July 16, 1996

INVENTOR(S): Dirk M. Coppens and Kathy Allewaert

It is certified that error appears in the above-identified patent and that said Letters Patent is hereby corrected as shown below:

Column 2, line 29, the word "De" should be "be," and

Column 4, line 13, "$C_nF2_{n++1}$" should be "$C_nF_{2n+1}$".

Signed and Sealed this

Twentieth Day of May, 1997

BRUCE LEHMAN

Attest:

Attesting Officer

Commissioner of Patents and Trademarks